United States Patent [19]

Thomson

[11] 4,025,995
[45] May 31, 1977

[54] LINEAR MOTION BALL BEARING ASSEMBLY AND BALL CONFORMING SHAFT

[75] Inventor: John B. Thomson, Manhasset, N.Y.

[73] Assignee: Thomson Industries, Inc., Manhasset, N.Y.

[22] Filed: June 5, 1974

[21] Appl. No.: 476,691

Related U.S. Application Data

[62] Division of Ser. No. 325,042, Jan. 19, 1973, Pat. No. 3,900,233.

[52] U.S. Cl. .................. 29/148.4 R; 29/148.4 C; 308/6 C; 308/216
[51] Int. Cl.² .................. B21D 53/10; B21K 1/04
[58] Field of Search .............. 29/148.4 C, 148.4 A, 29/148.4 R; 308/216, 6 A, 6 R, 6 C

[56] References Cited

UNITED STATES PATENTS

| 544,115 | 8/1895 | Perkins | 308/6 R |
|---|---|---|---|
| 640,397 | 1/1900 | Merker | 308/6 C |
| 1,443,789 | 1/1923 | Humphreys | 308/6 |
| 1,673,163 | 6/1928 | Schmelzkopf | 308/6 |
| 1,843,211 | 2/1932 | Davis | 64/9 A |
| 2,050,960 | 8/1936 | Olivetti | 308/6 R |
| 2,559,292 | 7/1951 | Ferger | 308/6 C |
| 2,605,622 | 8/1952 | Anderson | 308/6 A |
| 2,620,163 | 12/1952 | Stone | 64/23.7 |
| 2,681,836 | 6/1954 | Jarund | 308/6 C |
| 2,845,311 | 7/1958 | Cobb | 308/216 |
| 2,860,930 | 11/1958 | Schafranik | 308/6 R |
| 2,945,366 | 7/1960 | Sears | 308/6 C |
| 2,952,145 | 9/1960 | Thompson | 64/23.7 |
| 3,230,023 | 1/1966 | Dahl et al. | 308/216 X |
| 3,236,569 | 2/1966 | Moosman | 308/6 R |
| 3,311,426 | 3/1967 | Binns | 308/6 C |
| 3,332,728 | 7/1967 | Gibson | 308/216 |
| 3,336,057 | 8/1967 | Bloomquist | 308/216 |
| 3,341,262 | 9/1967 | Kalmanek | 308/6 R |
| 3,398,999 | 8/1968 | Halvorsen | 308/6 C |
| 3,484,944 | 12/1969 | Pryshlak | 308/6 R |
| 3,540,782 | 11/1970 | Worm | 308/6 C |
| 3,545,826 | 12/1970 | Magee et al. | 308/6 |
| 3,884,051 | 5/1975 | Bottoms | 308/6 A |

FOREIGN PATENTS OR APPLICATIONS

| 1,575,608 | 1/1970 | Germany | 308/6 C |
|---|---|---|---|
| 835,356 | 5/1960 | United Kingdom | 29/148.4 A |

Primary Examiner—C.W. Lanham
Assistant Examiner—V. K. Rising
Attorney, Agent, or Firm—Morgan, Finnegan, Pine, Foley & Lee

[57] ABSTRACT

A linear motion ball bearing assembly and shaft having ball conforming portions are combined to support heavier-than-normal loads and provide torque resistance. The bearing shaft is provided with one or more ball conforming grooves. The bearing assembly is provided with one or more load-bearing surfaces, each of which also includes a ball conforming groove, which may move circumferentially a very slight amount for tolerance variations in the angular spacing and parallelism of the shaft grooves, thereby assuring perfect ball conformity and line contact on the load-bearing surface of both the shaft and bearing assembly. Alternative configurations and methods of forming the ball conforming grooves on the shaft are also disclosed.

4 Claims, 17 Drawing Figures

LINEAR MOTION BALL BEARING ASSEMBLY AND BALL CONFORMING SHAFT

This is a division of application Ser. No. 325,042, filed Jan. 19, 1973 U.S. Pat. No. 3,900,233.

BACKGROUND AND OBJECTS OF THE INVENTION

The present invention relates generally to ball bearings for linear motion and to bearing shafts having ball conforming grooves and relates more particularly to certain new and useful improvements in such ball bearings and cooperating bearing shafts and to new and improved methods for providing the bearing shafts with such ball conforming grooves.

With a few exceptions linear motion ball bearings are run on cylindrical shafts having a smooth, ground, uninterrupted surface. The mating contact between the load carrying balls and the shaft surface is between two convex shapes. Theoretically, this results in a contact area of "zero." In practice, due to deflection of materials, a very small area of contact is developed. This is generally referred to as a "point contact."

In the sleeve of a linear ball bearing, the load carrying balls bear on a concave surface. The contact of this concave surface with the convex surface of the ball creates a line contact, rather than a point contact, which greatly reduces stresses developed when compared to the point contact of the ball with the shaft. For this reason, the critical point in the bearing and shaft assembly is the contact of the ball with the shaft, because of the severe stresses created in both the ball and the shaft. To alleviate this condition, attempts have been made to provide ball conforming grooves in the shaft upon which a linear motion ball bearing is mounted in an effort to provide line contact instead of a point contact. This effort has not been entirely successful because of the cost of grinding, or otherwise forming, the longitudinal grooves along the length of the shafting and the fact that it is not commercially feasible to maintain an exact angular position around the circumference of the shaft along its length.

It is desirable that the shafts upon which linear motion ball bearing assemblies freely move have hardened surfaces to carry the load transferred by the balls and to effectively utilize the load carrying capacity of such bearing assemblies. In the past, shafts for linear motion ball bearings, whether provided with smooth surfaces or with longitudinal grooves, have been heat treated to approximately 60 Rockwell C hardness and subsequently ground to the desired size and finish. These procedures when practiced on a commercial basis are costly due the warpage resulting from unequal stress distribution in the shaft attributable to the heat treating. Straightening of the shaft to remove the warpage has been required before the grinding and finishing steps have been performed. Frequently, it may be required to subject the shaft to straightening between passes through a grinding machine as the shaft is ground down to the final finished size. Such efforts to straighten the shaft, when required, are tedious and costly. Even where such a shaft is subjected to straightening, true alignment of a hardened metal shaft may not be achieved as commercially available straightening machines might not effectively correct small deviations from a true alignment, because the hardened metal of the shaft has unequal stress distribution and resists the force applied to straighten the shaft.

On the other hand, non-hardened steel shafts are less costly than hardened steel shafts, and may be more readily straightened and given true alignment. The use of non-hardened shafts would serve to eliminate warpage due to heat treating and the attendant manufacturing costs which otherwise would be incurred in attempting to straighten a hardened shaft. A non-hardened shaft, however, is not ideally suited for use with a linear motion ball bearing because it might not carry the load transferred by the balls and would not effectively utilize the load carrying capacity of the linear motion ball bearing.

This invention is directed to improvements in a linear motion ball bearing and in shafting upon which such bearing may move. The shafts in accordance with this invention may be formed of a low cost, soft, non-hardened or non-heat treatable material having one or more ball conforming groove, the grooves being formed either directly in the surface of the shaft or in strips inserted into the surface of the shaft or in strips placed on and secured to the surface of the shaft. According to one aspect of the invention, a non-hardened shaft, or non-hardened strips located on the shaft may be rolled to form and work harden a ball conforming groove in the unhardened shaft surface or the unhardened strip before or after it is located on the shaft. Thus, this invention may advantageously utilize non-hardened metal shafting which can be given true alignment and in or upon which there may be formed or placed hardened or hardenable portions for effectively carrying the load. The bearing is so constructed as to enable it to adjust its position in very slight amounts, if necessary, to compensate for manufacturing tolerances in the formation of the ball conforming grooves located on the shaft so that the ball conforming grooves formed in the sleeve of the linear ball bearing and the ball conforming grooves associated with the shaft are in exact register with the ball thereby serving to eliminate severe stresses which might ordinarily result due to manufacturing variations in parallelism or angular displacement of the ball conforming grooves which has, in the past, led to failure of the parts. This invention also enables significant savings in manufacturing costs, increased life and load capacity of the linear motion ball bearing and shaft and enhances the torque resistance between the bearing and the shaft.

It is therefore an object of this invention to provide a new and improved linear motion ball bearing and bearing shaft.

Another object of this invention is to provide a new and improved linear motion ball bearing and bearing shaft combination having increased load-carrying capacity.

A further object of this invention is to provide a new and improved linear motion ball bearing having load-carrying plates which may move circumferentially a very slight amount and which cooperate with ball conforming grooves located on the bearing shaft providing exact register of the load-carrying plate of the bearing and the grooves located on the bearing shaft and, hence, increased load-carrying capacity.

Another object of this invention is to provide a new and improved bearing shaft.

A further object of this invention is to provide a new and improved bearing shaft which includes one or more ball conforming grooves.

A further object of this invention is to provide a new and improved bearing shaft which may be formed in a true axial line and which has load-bearing portions comprised of hardened metal.

Another object of this invention is to provide a new and improved bearing shaft having load-bearing portions comprised of hardened metal, which may be manufactured at reduced cost over present hardened metal shafts.

Another object of this invention is to provide a new and improved bearing shaft comprised of soft, non-heat-treated material having one or more hardened metal strip members secured thereto, each of which is formed with a ball conforming groove on its outer surface.

Still another object of this invention is to provide a new and improved bearing shaft of soft, non-heat-treated material having one or more hardened ball conforming grooves which have been formed as by rolling and hardened by cold working, the grooves being formed either in the shaft or in non-hardened strips located on the shaft.

Another object of this invention is to provide a new and improved bearing shaft comprised of soft, non-heat-treated material having one or more hardened metal strip members secured thereto, each of which is formed with a ball conforming groove, and in which the strip members are compliant circumferentially of the bearing shaft.

A still further object of this invention is to provide certain new and improved methods for forming ball conforming grooves on bearing shafts.

Objects and advantages of this invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations, steps, processes and improvements herein shown and described.

SUMMARY OF THE INVENTION

Briefly described, the linear motion ball bearing of the present invention includes a ball retainer preferably formed from a moldable material having load-bearing and load-free ball raceways. A rigid load-carrying plate member is attached to each load-bearing portion of each of the raceways where the balls directly contact the shaft upon which the bearing is mounted.

The bearing shaft of the present invention is formed with one or more axially extending, circumferentially spaced, hardened ball conforming grooves equal in number to the load-bearing portions of the bearing and spaced so as to be in registry with the ball tracks of such load-bearing portions. Preferably, the bearing shaft is formed of a "soft," non-heat-treated, metal to which hardened or heat-treatable metal strip members carrying a ball conforming groove are attached, or in which ball conforming grooves are formed by cold working the grooves into the shaft. In alternate embodiments, the metal strip members are mounted in slots formed in the shaft surface by press-fit or slip-fit, or are bonded directly to the circumferential surface of the shaft. Where bonded to the shaft, the strip members preferably include a portion which is spaced from the shaft surface, permitting slight deformation resulting in circumferential compliance under load.

In a preferred method of the invention for securing the heat-treatable metal inserts to the soft metal bearing shaft, the shaft is provided with a slot having longitudinally extending undercut portions and the insert strip member is drawn to the same general configuration and slip-fit into the shaft slot. Thereafter, the insert strip member is rolled to the size of the slot to thereby be locked in place, whereupon it is heat-treated until suitably hardened.

It will be understood from the foregoing general description that the objects of the invention specifically enumerated herein are accomplished by the invention as here embodied.

Thus, by providing a ball bearing in which load-carrying plates are slightly movable circumferentially of the bearing shaft and by providing the bearing shaft with ball conforming grooves cooperating with the bearing, the bearing and shaft assembly have greatly increased load capacity, life expectancy and torque resistance.

Furthermore, by utilizing hardened metal inserts having ball conforming grooves formed therein, the bearing shaft can be manufactured at reduced cost form soft metals and also can be formed with greater accuracy in its trueness. In addition, where the strip members are bonded directly to the bearing shaft, deformation and consequently circumferential compliance can be obtained resulting in further increased load-carrying capacity of the bearing and shaft assembly.

It will be understood that the foregoing general description and the following detailed description as well are examplary and explanatory of the invention but are not restrictive thereof.

The accompanying drawings, referred to herein and constituting a part hereof, illustrate preferred embodiments of the invention, and together with the description, serve to explain the principles of the invention.

BRIEF DESCRIPTION OF THE DRAWINGS

FIG. 13 illustrates a metal strip shaped to fit in a slot formed on a bearing shaft;

FIG. 14 illustrates a pressure roller for deforming and working the metal strip member to conform the shape of the strip member to the shaft slot thereby locking the strip in place and forming and work hardening the ball conforming groove; and FIG. 15 illustrates the metal strip member expanded and locked in the shaft and showing ball conforming grooves produced in the shaft by the cold working to form the hardened grooves and showing, in an exaggerated manner for clarity of illustration, the outward flow of the shaft metal resulting from the cold working of the shaft by the roller in forming the grooves.

DESCRIPTION OF THE PREFERRED EMBODIMENTS

Figure 1:
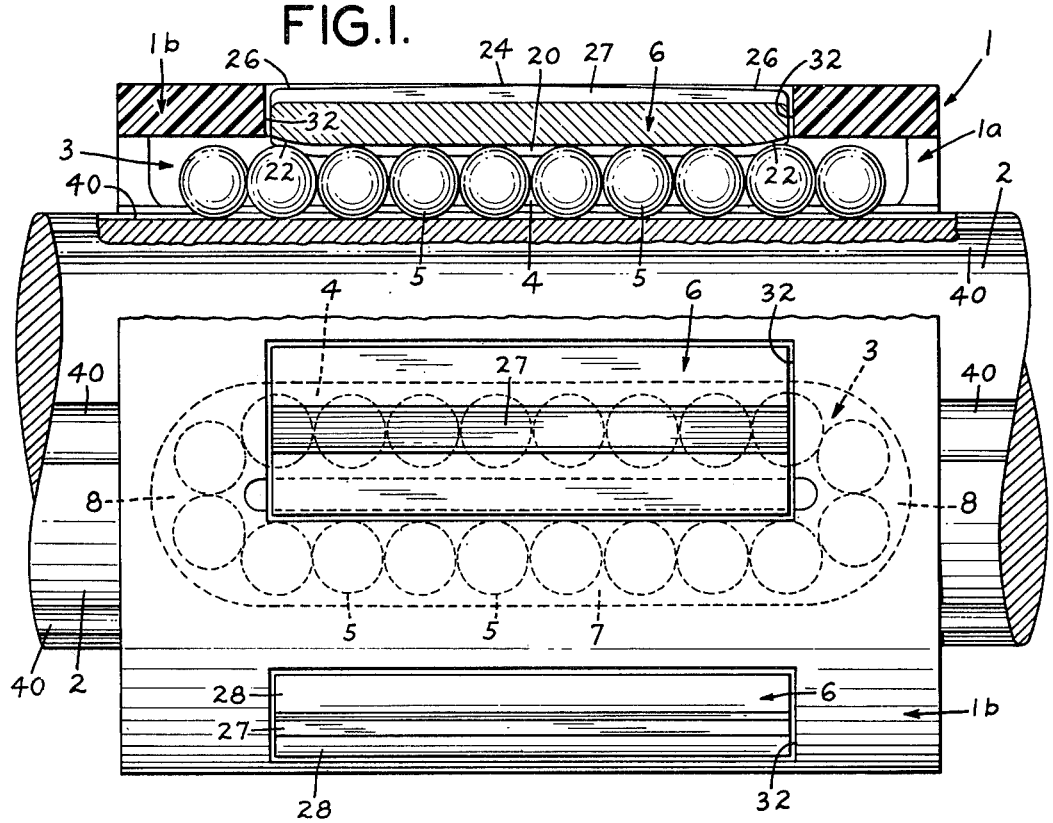
FIG. 1 is a view in side elevation, partly sectional and partly diagrammatic, of a compliant, self-aligning linear motion ball bearing assembly constructed in accordance with the invention having ball conforming grooves cooperating with the balls in the load-bearing portions of each of the ball raceways of the bearing assembly.
Figure 2:
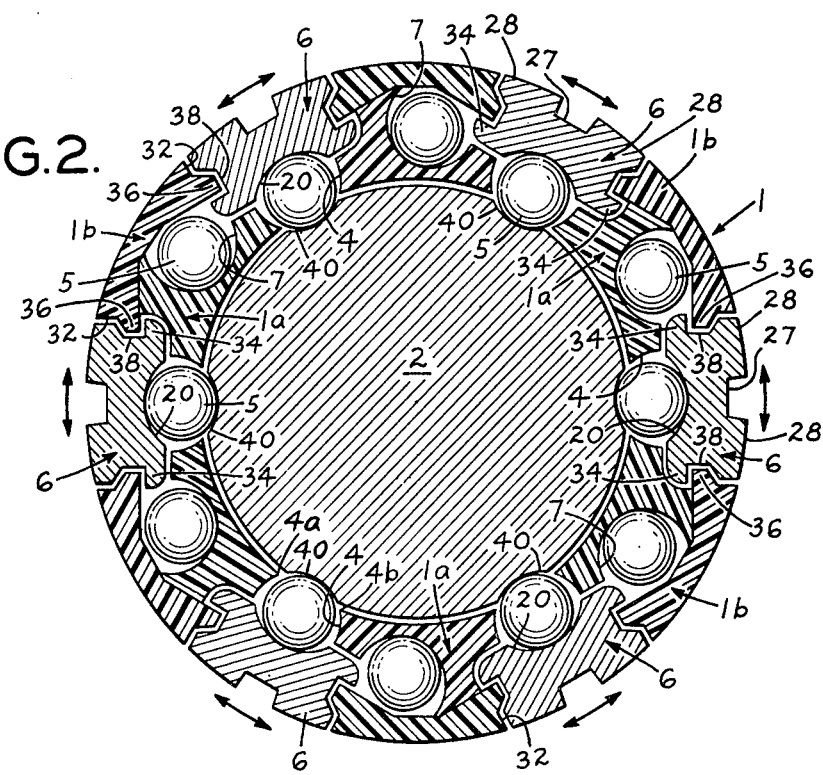
FIG. 2 is a transverse sectional view of the bearing shaft and ball bearing assembly shown in FIG. 1, partly in elevation, illustrating the load-bearing and load-free portions of a series of ball raceways which extend longitudinally of the bearing assembly at evenly spaced intervals about the shaft, and also illustrating, in an exaggerated manner for clarity of illustration, the slight circumferential displacability of the individual load-carrying plates of the bearing assembly, and showing the ball conforming grooves on the shaft located in registry with the load-bearing portions of the bearing raceways.

Referring now more particularly to the embodiment of the invention shown in FIGS. 1-2 of the accompanying drawings, there is illustrated a bearing 1, surrounding a bearing shaft 2, and having a plurality of generally oblong-shaped raceways 3 formed therein, each being designated only, generally, by the foregoing reference numerals. As preferably embodied, bearing 1 includes a ball retainer sleeve 1a and an outer shell 1b held against movement relative to each other by interlocking members or by suitably bonding the contiguous surfaces.

Each oblong raceway 3 preferably has a first straight, load-bearing portion 4 wherein the recirculating balls 5 are in direct bearing contact with both the shaft 2 and a load-carrying plate 6 and a further straight portion 7, wherein the balls 5 are out of contact with the shaft and are free of the load. The straight portions 4 and 7 are advantageously connected by a pair of curved portions 8, which permit the recirculating balls to pass freely from one straight portion of the raceway into the other according to the direction in which the load-carrying balls are impelled by the movement of the bearing relative to the bearing shaft.

The ball retainer 1a and shell 1b are preferably formed from a resilient, non-metallic material. Examples of materials which have been found to operate entirely satisfactorily are such plastics as nylon and Delrin, and it will be apparent that other moldable materials may also be satisfactorily used. Advantageously, the material is selected so that the retainer may be produced by low cost, high-speed, mass manufacturing methods, such as injection molding of plastics. The ball retainer and outer shell may also be made of self-lubricating by incorporating a small amount of a lubricant, such as finely divided molybdenum disulfide, in the material, as the plastics nylon or Delrin, of which the retainer and shell are formed.

As preferably here embodied, the bottom of the straight, load-bearing portion 4 of each raceway 3 is slotted, as indicated by the edges 4a and 4b (FIG. 2), so that the balls 5 may contact the shaft 2, the slot being somewhat narrower than the diameter of the balls. The slot terminates at each end of the straight portion 4, whereupon the bottom is closed and is slightly inclined along the curved portion 8 of the raceway until it reaches the level of the bottom 9 of the straight, load-free portion 7 of the raceway. It will thus be seen that the balls 5 are in direct contact with both the shaft 2 and the load-carrying plate 6 when in the straight portion 4 of the raceway but have no contact with either the shaft 2 of the load while in the curved portions 8 or straight portion 7 of the raceway.

The load-carrying plates 6 each include an axially extending cylindrical groove 20 on the inner surface thereof, in which the load-carrying balls may roll. Preferably, each of the grooves 20 has a radius very slightly larger than the radius of the balls 5 rolling therein, so that the plate may yield as it is placed under load. The inner surface of each of the plates is also relieved at its ends 22 to facilitate transfer of the balls from the working track to the non-working portions of the raceway.

On its outer portion each of plates 6 is formed with an intermediate or longitudinally central portion 24 which is thicker than the end portions 26. The intermediate portion 24 is preferably tapered longitudinally on its exterior surface at a small angle towards both ends. Thus the intermediate curved portion 24 forms a rocking fulcrum allowing the plates 6 to rock to provide additional clearance and, if required, by slight displacement of the resilient mass of the bearing in which they are embedded and held in the event that the shaft 2 supporting the bearing is angularly displaced with respect to the axis of the bearing.

Each of the plates 6 is also advantageously formed with an external, longitudinal groove or slot 27 bordered by two longitudinally extending lands 28 by which each of the plates 6 is supported in the bore in which the bearing may be mounted, thereby providing an intermediate area of reduced thickness which provides compliance to the working portion of the groove in the plate 6 and serves to distribute the load over a wider area than would be the case with a rigid plate or a plate having its central portion resting against the bores. The longitudinally tapered ends of the plates 6 also provide a degree of resilience in the axial direction of the bearing and likewise distribute the load by compliance since the loading is seldom uniform about the length of a linear ball bearing. This bi-axial resiliency results in increased load capacity and greater life than is obtainable with a rigid race member.

In accordance with the invention, means are provided for mounting the load-carrying plate members 6 in the load-bearing portions 4 of the bearing raceways 3 so as to permit slight movement of the plates in a direction circumferentially of the bearing shaft. To this end, the outer shell 1b of bearing 1 is formed with suitable apertures 32 symmetrically arranged circumferentially of the shell, each of which is adapted to receive a load-carrying plate 6 therein. Apertures 32 are preferably only slightly longer than plates 6, so as to permit rocking movement of the plates but otherwise prevent relative axial movement between the plates and the bearing. Each plate 6 includes longitudinally extending ears 34 on each side thereof which are adapted to be freely slidably engaged by longitudinally extending resilient projections or lip portions 36 formed integrally with the outer shell 1b of the bearing. Thus, plates 6 are mounted within apertures 32 by pushing them radially inwardly past the retainer projections 36, whereupon they are locked in the aperture, although some radial movement is permitted.

Finally, each of plates 6 also includes longitudinally extending depressions 38 on each of the sides thereof adjacent ears 34, which are in generally opposed alignment with the projections 36 of the retainer when the plates are mounted in place, thereby permitting the plates to move very slightly circumferentially, if necessary, of the bearing shaft, as indicated by the arrows on FIG. 2. It is to be understood that the spacing shown between projections 36 and depressions 38 in the drawings is exaggerated for clarity of illustration, as the spacing need be very small to permit, if necessary, very slight movement to accommodate tolerance variations in the angular spacings and parallelism of the shaft grooves. In many instances, the very small spacing coupled with the resilience of the materials of which the ball retainer and shell would be sufficient to accommodate the tolerance variations which may be encountered.

However, when the linear motion ball bearing and shaft are intended for use in applications requiring a very high degree of precision and where, for example, zero relative rotation between the shaft and bearing housing is required, circumferential motion of the ball conforming groove in the load-carrying plate can be prevented by eliminating the clearance space between the load-carrying plate and the outer shell of the bearing as indicated by the spacing between projections 36 and depressions 38. The prevention of relative movement would require exact circumferential location of the ball conforming grooves associated with the shaft as well as near perfect parallelism of all of the ball conforming grooves on the shaft.

In accordance with the invention, there is located on bearing shaft 2 one or more axially extending, circumferentially spaced, ball confroming grooves equal in number to the load-bearing portions of the bearing with which the shaft is used and spaced so as to be in registry with the ball tracks of such load-bearing portions. Accordingly, although the invention as respects the formation of the ball conforming grooves may be illustratively described with respect to one groove associated with the shaft it is to be understood that the description is applicable to other ball conforming grooves which may be located on the shaft.

To this end, in the embodiment of the invention illustrated in FIGS. 1-2, six such ball conforming grooves 40 are ground, or otherwise suitably machined, directly in the circumferential surface of the bearing shaft 2. Grooves 40 are thus equal in number, and are spaced so as to be in registry with, the six straight, load-bearing portions 4 formed in bearing retainer 1a.

It will thus be seen that the ball conforming grooves 40 in the bearing shaft 2 cooperate with the load-carrying plates of the bearing to provide line contact of the bearing balls on both the shaft surface and the surface of the load-carrying plates of the bearing assembly and, consequently, provide greater load capacity and longer life and torque assistance.

Figure 3:
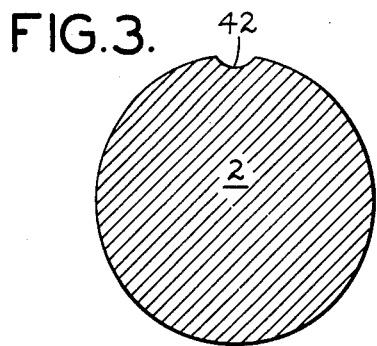
FIG. 3 is a transverse sectional view of a bearing shaft similar to that shown in FIG. 1, illustrating a single ball conforming grooved formed in the surface of the shaft.
Figure 4:
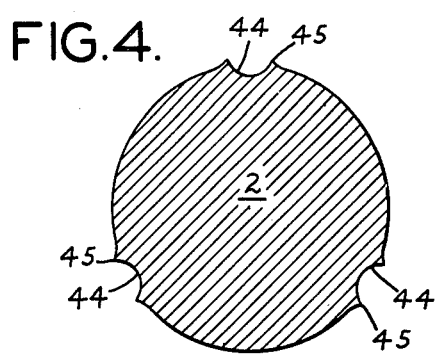
FIG. 4 is a transverse sectional view of a bearing shaft according to this invention illustrating three ball conforming grooves located in the surface of the shaft at equally circumferentially spaced intervals, the ball conforming grooves produced in the shaft by cold working to form work hardened grooves and showing, in an exaggerated manner for clarity of illustration, the outward flow of the shaft metal resulting from cold working of the shaft, as by rolling, to form the grooves.

Referring now to FIGS. 3-4 of the accompanying drawings, there is shown a bearing shaft 2 in which a single ball conforming groove 42 (FIG. 3) and a plurality of three such ball conforming grooves 44 (FIG. 4) are located on the shaft. Although not here illustrated, it will be understood that, with respect to each of FIGS. 3-4, a ball bearing assembly advantageously constructed as shown in FIGS. 1-2, having an equal number of straight, load-bearing track portions, is intended to be mounted in operative relation on the shaft.

The bearing shaft 2 of FIG. 3 may be formed of heat-treatable material, such as steel. Groove 42 may be formed in the shaft of FIG. 3 either before or after the shaft is subjected to the hardening process, as heat-treating. Alternatively, and in accordance with this invention, the ball conforming groove 42 in the shaft of FIG. 3 may be formed by grinding a heat-treated hardened shaft surface or by cold forming a non-heat-treated shaft surface by the application of a rolling force, suitably a roller. The forming of the ball conforming groove by the applicaton of such a force work hardens the groove surface to enable it to withstand the pressure of the load carrying balls. In the embodiment illustrated in FIG. 4, three grooves 44 are formed in the surface of shaft 2 by cold forming of a soft, non-heat-treated surface by the application of a rolling force. The metal of the shaft may be forced to cold flow as a result of the cold working of the shaft as indicated at 45 above the surface of the shaft to increase the area of ball support within the ball conforming groove.

Figure 5:
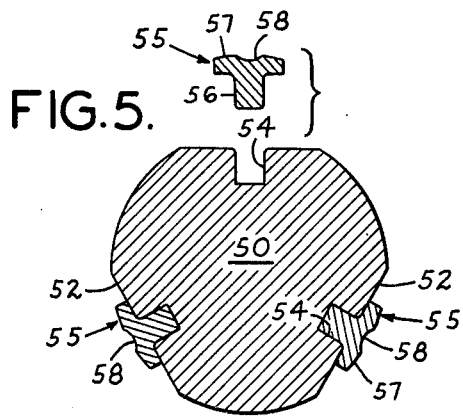
FIGS. 5-7 are transverse sectional views of another embodiment of a bearing shaft constructed in accordance with the inventon, illustrating ball conforming grooves formed in the shaft by means of heat-treatable metal insert strip members of varying shape having a ball conforming groove formed in the outer surface thereof, each of the strip members adapted to be press-fit into slots formed in the shaft surface.
Figure 6:
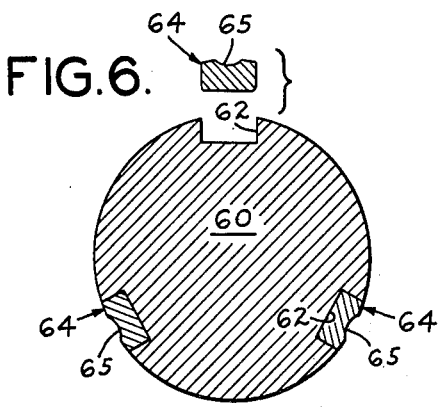
Figure 7:
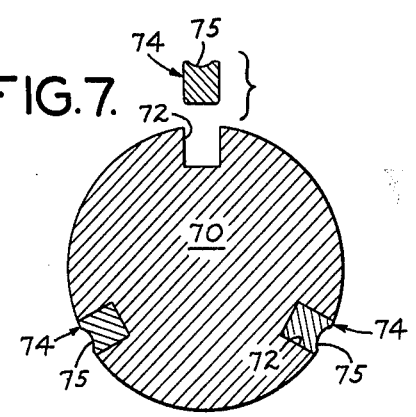

Referring to FIGS. 5-7, there are illustrated shafts 50, 60, 70, respectively, each preferably formed of a "soft" material such as non-heat-treated steel as contrasted with hardened steel, or other suitable non-heat-treatable material, such as SAE 1015. Each of shafts 50, 60, 70 is formed with slots which receive, preferably by means of a press-fit, heat-treatable metal insert strip members, each of which has a ball conforming groove formed on the outer surface thereof.

Referring particularly to FIG. 5, shaft 50 preferably has equi-spaced chordal sections removed therefrom so as to form flat surfaces 52 thereon which extend perpendicularly to a straight line drawn through the center of the shaft. Axially extending slots 54 of rectangular cross-sectional shape are formed in the shaft and are each adapted to receive an insert strip member 55 therein. As here embodied, insert 55 is generally T-shaped in cross-section, having an upright leg 56 which is press-fit into slot 54. The outer surface 57 of insert 55 is advantageously shaped so as to lie in the plane of the circumferentially extending surface of shaft 50 and includes an axially extending ball conforming groove 58.

Referring particularly to FIG. 6, shaft 60 is formed with rectangular slots 62 having a horizontal longitudinal dimension, into which correspondingly shaped heat-treatable metal insert strip members 64 are press-fit, each insert having a ball conforming groove 65 on the outer surface thereof.

Referring particularly to FIG. 7, the shaft 70 is formed with rectangular slots 72 having a vertical longitudinal dimension, into which correspondinly shaped insert strip members 74 are press-fit, each insert having a ball conforming groove 75 on the outer surface thereof.

Figure 8:
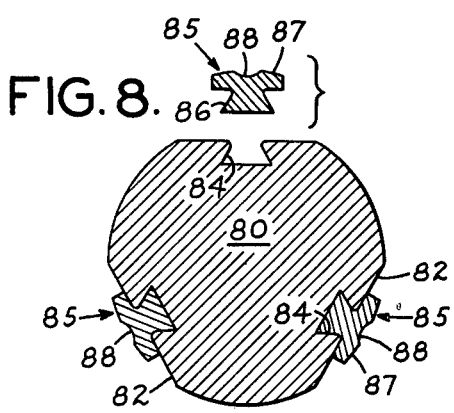
FIGS. 8-10 are transverse sectional views of a second alternate embodiment of a bearing shaft constructed in accordance with the invention, illustrating ball conforming grooves formed in the shaft by means of heat-treatable metal insert strip members of varying shape having a ball conforming groove formed in the outer surface thereof, each of the strip members adpated to be slip-fit into correspondingly shaped slots formed in the shaft surface.
Figure 9:
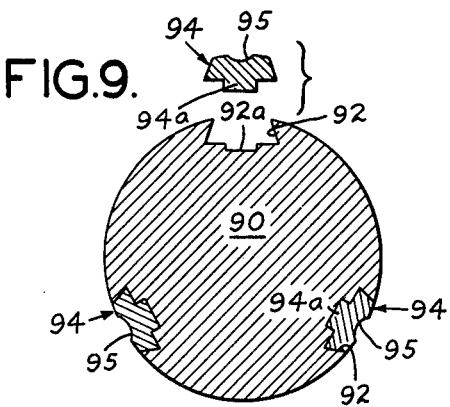
Figure 10:
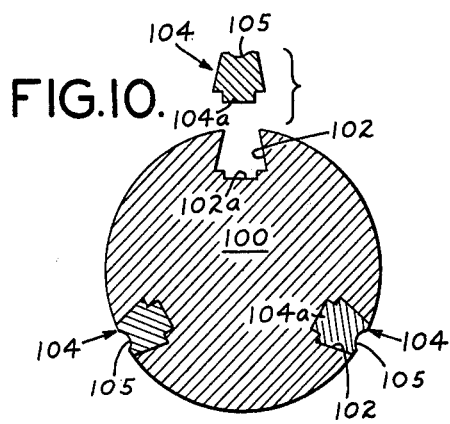

Referring now more particularly to FIGS. 8–10 of the accompanying drawings, there are illustrates shafts 80, 90, 100, respectively, each preferably formed of a "soft" material, as previously described, and each of which is formed with slots which are adapted to receive by means of a slip-fit, heat-treatable metal insert strip members each having a ball conforming groove on the outer surface thereof.

Referring particularly to FIG. 8, shaft 80 preferably has equi-spaced chordal sections removed so as to form flat surfaces 82 thereon which extend perpendicularly to a straight line drawn through the center of the shaft. Axially extending dovetail slots 84 are formed in the shaft and are each adapted to receive an insert strip member 85 therein. As here embodied, insert 85 is generally T-shaped in cross-section, the upright leg 86 having a shape corresponding to that of slot 84 so as to be mounted therein by means of a slip-fit. The outer surface 87 of insert 85 is shaped so as to lie in the plane of the circumferentially extending surface of shaft 80 and includes an axially extending ball conforming groove 88.

Referring to FIG. 9, shaft 90 is formed with generally rectangular dovetail slots 92 having a horizontal longitudinal dimension and a central, longitudinally extending groove 92a in the bottom thereof. A correspondingly shaped heat-treatable metal insert strip member 94 is mounted in each slot by means of a slip-fit. Insert 94 includes a central, longitudinally extending bottom rib 94a which is received in groove 92a, and is provided with a ball conforming groove 95 on its outer surface.

Referring to FIG. 10, the shaft 100 is formed with generally rectangular dovetail slots 102 having a vertical longitudinal dimension and a central, longitudinally extending groove 102a in the bottom thereof. A correspondingly shaped heat-treatable metal insert strip member 104 is mounted in each slot by means of a slip-fit. Insert 104 includes a central, longitudinally extending bottom rib 104a which is received in groove 102a, and is provided with a ball conforming groove 105 on its outer surface.

The insert strip members illustrated in each of FIGS. 5–10 may be heat-treated and hardened either before or after insertion in the slots formed in the respective shafts.

Figure 11:
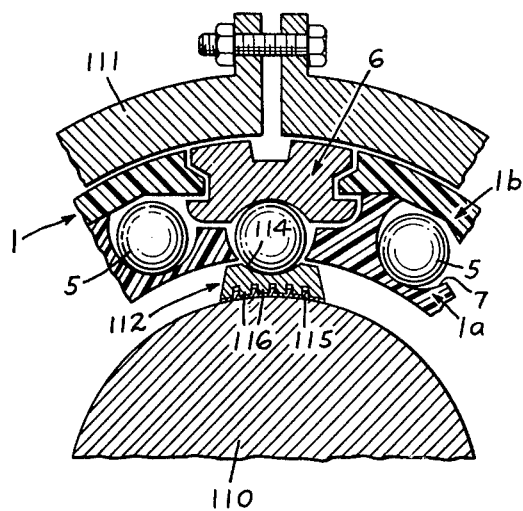
FIG. 11 is a fragmentary, transverse sectional view, partly in elevation, of a ball bearing assembly mounted in operative relation about a further embodiment of a shaft constructed in accordance with the invention, the ball conforming grooves of the shaft being formed by heat-treatable metal strip members having the ball conforming grooves formed on the outer surface thereof attached to the circumferential surface of the bearing shaft.

Referring now to FIG. 11 of the accompanying drawings, there is illustrated a further embodiment of a bearing shaft constructed in accordance with the invention, shown with a ball bearing assembly as illustrated in FIGS. 1–2 mounted on the shaft, in operative relation thereto, the bearing assembly being enclosed within a suitable adjustable housing sleeve 111.

As here embodied, shaft 110 is advantageously formed of a soft material, as previously described, and is provided with a heat-treatable metal strip member 112 which is affixed to the outer circumferential surface of the bearing shaft and which contains a ball conforming groove 114 on its outer surface. Advantageously, stip 112 is affixed to shaft 110 by means of a suitable adhesive bonding or brazing material 115 or by silver soldering. Also advantageously, the bottom surface of strip 112 is formed with a series of teeth 116 and the bonding material preferably partially flows into the spaces between the teeth, as illustrated. Thus, the bonding material which has flowed between teeth 116 assists in anchoring strip member 112 to the shaft and serves as a lock against circumferential movement of the strip. In addition, the space between the teeth not filled by the bonding material permits some reserve space for slight excesses of bonding material thereby enabling uniform coating of the strip on the shaft surface.

Figure 12:
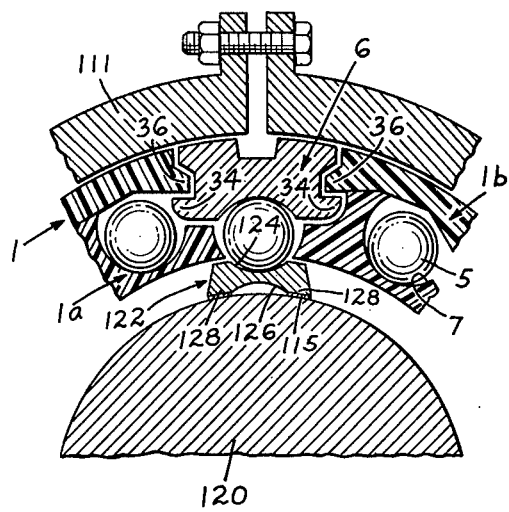
FIG. 12 is a view similar to FIG. 11, illustrating an alternate embodiment of the heat-treatable strip member, in which the bottom thereof has a portion spaced from the circumferential surface of the bearing shaft.
Figure 14:
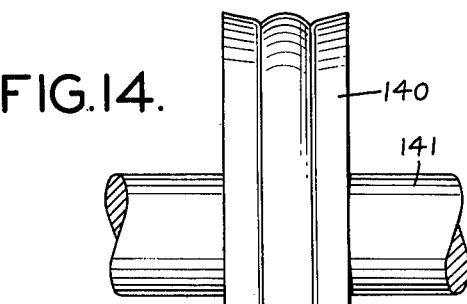
FIGS. 13-15 collectively illustrate a method according to the invention for inserting a heat-treatable or work-hardenable metal strip member having a ball conforming groove into a slot formed in the metal shaft.

Referring to FIG. 12 of the accompanying drawings, there is illustrated another embodiment of a bearing shaft constructed in accordance with the invention shown with a ball bearing assembly and adjustable housing sleeve, as in FIG. 11. In this embodiment, shaft 120 and a strip member 122 having a ball conforming groove 124 formed on the outer surface thereof are each formed of a material similar to that described for the embodiment illustrated in FIG. 11. Here, however, the bottom surface of strip 122 is provided with a longitudinally extending depession 126 bordered by two longitudinally extending lands 128 which serve to mount the strip 120 by means of a suitable bonding material 115, as previously described.

Each of strips 112 and 122 may be heat-treated, so as to become hardened, either before or after they are secured to the bearing shaft. Advantageously, where the strips are attached to the shaft by brazing or silver soldering, the strips may be simultaneously heat-treated brazed or soldered to the shaft as by induction heating.

In each of the embodiments illustrated in FIGS. 11 and 12, it will also be understood that the adjutable housing sleeve 11 permits the bearing to be preloaded or to have some degree of clearance, if desired.

Figure 13:
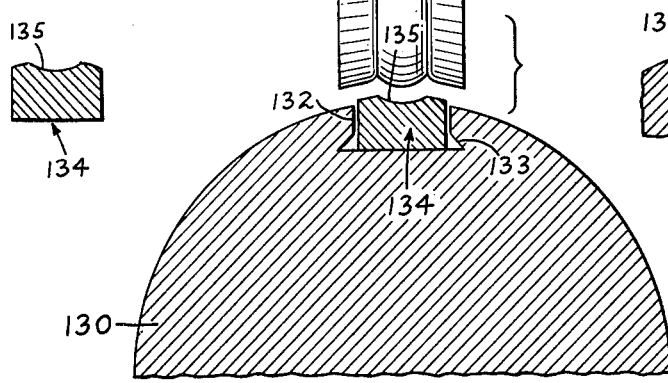
Figure 15:
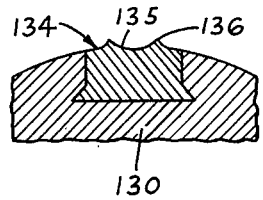

Referring now more particularly to FIG. 13 of the accompanying drawings, there is illustrated a method of inserting a heat-treatable or hardenable rectangular metal insert strip member into a bearing shaft. As here embodied, a bearing shaft 130, advantageously formed of a soft metal, as previously described, is formed with at least one generally rectangular slot 132 having longitudinally extending undercut portions 133 on each side thereof adjacent the bottom surface of the slot. The rectangular strip 134 is placed in the slot, and, thereafter strip 134 is rolled to the size and shape of slot 132, as by pressure roller or other means. Roller 140 may be suitably mounted for rotation on a shaft 141 and arranged to apply a rolling force along the entire length of strip 134. The roller will serve to deform the strip into a cross section conforming to that of slot 132 locking strip 134 in place within the slot. For light loads, the ball conforming groove 135 may be formed in a non-heat-treated or treatable strip and the groove formed and work-hardened by a rolling element. By proper control of the cold flow of the shaft material, additional area of ball conformity may be obtained by allowing the material to flow above the surface of the strip 134, as indicated at 136 in FIG. 15.

Figure 16:
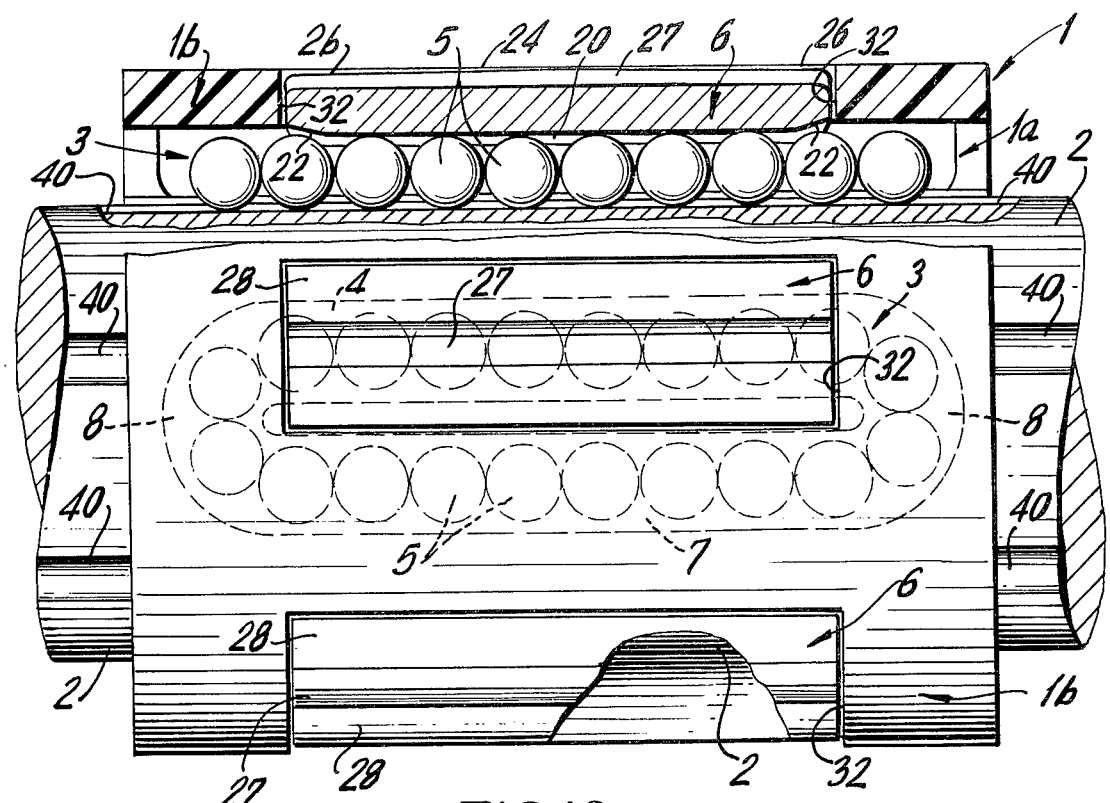
FIG. 16 is a view in side elevation, partly sectional and partly diagrammatic, of a compliant self-aligning linear motion assembly constructed in accordance with the invention having ball-conforming grooves cooperating with the balls in the load-bearing portions of each of the ball raceways of the bearing assembly with the bearing being of the open type.
Figure 17:
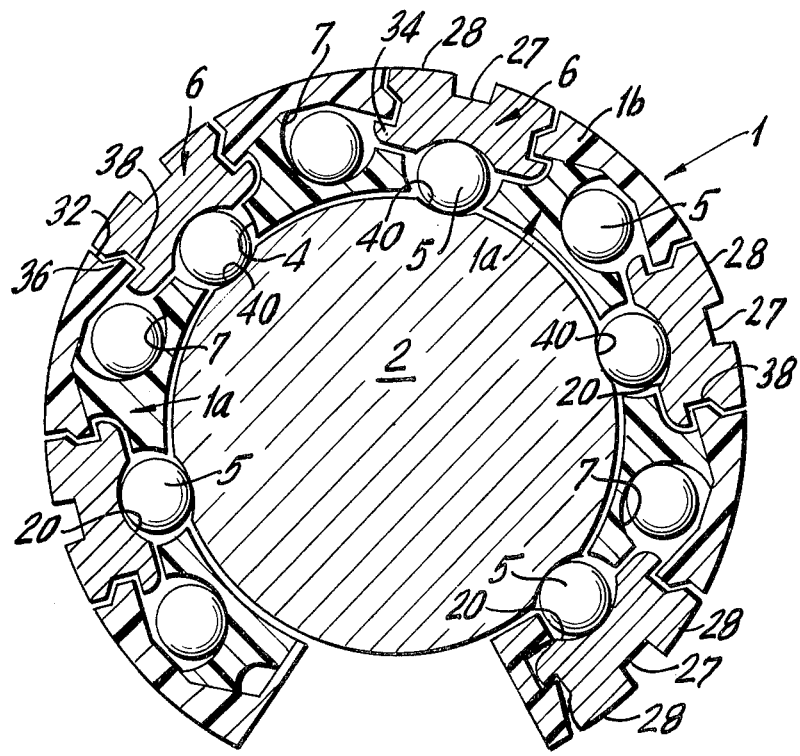
FIG. 17 is a transverse sectional view of the bearing shaft and ball bearing assembly of the open type shown in FIG. 16.

The invention is also applicable to bearings of the open type such as, for example, the linear motion ball bearings described in U.S. Pat. Nos. 2,628,135 and 3,588,200. Open type linear ball bearings are provided with a longitudinal opening extending through the ball retainer sleeve, as 1a, and outer shell 1b and extending throughout the length of the bearing as illustrated in FIGS. 16 and 17. Open type bearings find application on externally supported shafts with the opening in the bearing permitting movement of the bearing along the length of the shaft. As will be appreciated by workers skilled in the art, the location of the ball conforming grooves in the shaft will be determined by the location of the raceways in the open type bearing having regard to the circumferential displacement of the raceways necessitated by the opening formed in the bearing. Open type bearings made in accordance with this invention may also be provided with adjustable diameter housings for further control of clearances and to permit preloading of the bearing.

The invention in its broader aspects is not limited to the specific embodiments herein shown and described but departures may be made therefrom within the scope of the accompanying claims, without departing from the principles of the invention and without sacrificing its chief advantages.

What is claimed is:

1. A method of forming a shaft with at least one hardened metal, axially extending groove on the surface thereof, comprising the steps of:

forming an axially extending, generally rectangular slot with longitudinally extending undercut portions adjacent the bottom thereof in the surface of said shaft, forming an elongated strip member from a heat-treatably, hardenable material having an axially extending groove on one surface thereof and another portion thereof having a shape corresponding to that of said slot, fitting said strip member into said slot, and pressure rolling said strip member to the size of said slot to thereby lock said strip member within said slot.

2. A method as claimed in claim 1, including the step of heat-treating said strip member before it is secured in said slot.

3. A method as claimed in claim 1, including the step of heat-treating said strip member after it has been secured in said slot.

4. A method of forming a shaft with at least one hardened metal, axially extending groove on the surface thereof, comprising the steps of: forming an axially extending slot in the surface of said shaft, forming an elongated strip member from a heat-treatably, hardenable material having an axially extending groove on one surface thereof and another portion thereof having a shape corresponding to that of said slot, and securing said strip member in said slot along the axial length thereof so that said groove is located adjacent the circumferential surface of said shaft, and removing chordal sections from said shaft at equi-spaced locations about the shaft periphery to provide longitudinally extending chordal surfaces, and forming said axially extending slot in one of said chordal surfaces.

* * * * *

UNITED STATES PATENT AND TRADEMARK OFFICE
CERTIFICATE OF CORRECTION

PATENT NO. : 4,025,995
DATED : May 31, 1977
INVENTOR(S) : John B. Thomson

It is certified that error appears in the above—identified patent and that said Letters Patent are hereby corrected as shown below:

Column 4, line 22, change "form" to - - from - -.

Column 5, line 17, change "adpated" to - - adapted - -.

Column 5, line 46, after "shaft", insert - - slot - -.

Column 10, line 57, change "11" to - - 111 - -.

Signed and Sealed this

Thirteenth Day of September 197

[SEAL]

Attest:

RUTH C. MASON
Attesting Officer

LUTRELLE F. PARKER
Acting Commissioner of Patents and Trademark